United States Patent
Lomayev et al.

(10) Patent No.: US 9,793,964 B1
(45) Date of Patent: Oct. 17, 2017

(54) APPARATUS, SYSTEM AND METHOD OF COMMUNICATING A MIMO TRANSMISSION WITH GOLAY SEQUENCE SET

(71) Applicant: INTEL CORPORATION, Santa Clara, CA (US)

(72) Inventors: Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/390,637

(22) Filed: Dec. 26, 2016

Related U.S. Application Data

(60) Provisional application No. 62/364,050, filed on Jul. 19, 2016, provisional application No. 62/331,644, filed on May 4, 2016.

(51) Int. Cl.
*H04L 27/00* (2006.01)
*H04B 7/0413* (2017.01)
*H04B 7/06* (2006.01)

(52) U.S. Cl.
CPC ......... *H04B 7/0413* (2013.01); *H04B 7/0634* (2013.01)

(58) Field of Classification Search
CPC ....... H04L 1/0041; H04B 7/0413; H04B 7/06; H04B 7/068; H04B 7/0452; H04B 7/04;
(Continued)

(56) References Cited

U.S. PATENT DOCUMENTS

| | | |
|---|---|---|
| 2011/0209035 A1 | 8/2011 | Lakkis |
| 2012/0207192 A1* | 8/2012 | Zhang ................... H04J 13/102 375/135 |
| 2013/0215868 A1 | 8/2013 | Chun et al. |

FOREIGN PATENT DOCUMENTS

| | | |
|---|---|---|
| JP | 2006518146 | 8/2006 |
| WO | 2013154584 | 10/2013 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Rahel Guarino
(74) *Attorney, Agent, or Firm* — Shichrur & Co.

(57) ABSTRACT

Some demonstrative embodiments include apparatus, system and method of communicating a Multiple-Input-Multiple-Output (MIMO) transmission with Golay Sequence Set (GSS). For example, an apparatus may include logic and circuitry configured to cause a wireless station to generate a Golay Sequence Set (GSS) including a plurality of complementary Golay sequence pairs based on a plurality of weight vectors, the plurality of weight vectors including one or more weight vectors corresponding to one or more respective stream numbers, which are equal to or greater than 9; and transmit a Multiple-Input-Multiple-Output (MIMO) transmission over a plurality of spatial streams, the MIMO transmission including at least one field transmitted over a spatial stream having a stream number equal to or greater than 9, the field is based on a complementary Golay sequence pair of the plurality of complementary Golay sequence pairs, which is based on a weight vector corresponding to the stream number.

25 Claims, 4 Drawing Sheets

(58) Field of Classification Search
CPC ...... H04H 20/71; H04W 84/12; H04W 88/02; H04W 4/02; H03M 13/1505; H03M 13/6525; H04J 13/0014; H04J 13/10
USPC .................................. 375/295, 260, 267, 299
See application file for complete search history.

(56) References Cited

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2017/026303, dated Jul. 10, 2017, 10 pages.

Eldad Perahia (Intel Corp.), 'Golay Sequences',IEEE P802.11 Wireless LANs, IEEE 802.11-11/0927r1, Feb. 14, 2012, 3 pages.

\* cited by examiner

APPARATUS, SYSTEM AND METHOD OF COMMUNICATING A MIMO TRANSMISSION WITH GOLAY SEQUENCE SET

CROSS REFERENCE

This Application claims the benefit of and priority from U.S. Provisional Patent Application No. 62/364,050 entitled "APPARATUS, SYSTEM AND METHOD OF COMMUNICATING A MIMO TRANSMISSION WITH GOLAY SEQUENCE SET", filed Jul. 19, 2016, and from U.S. Provisional Patent Application No. 62/331,644, entitled "GOLAY SEQUENCES FOR WIRELESS NETWORKS", filed May 4, 2016, the entire disclosures of which are incorporated herein by reference.

TECHNICAL FIELD

Embodiments described herein generally relate to communicating a Multiple-Input-Multiple-Output (MIMO) transmission with Golay Sequence Set (GSS).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
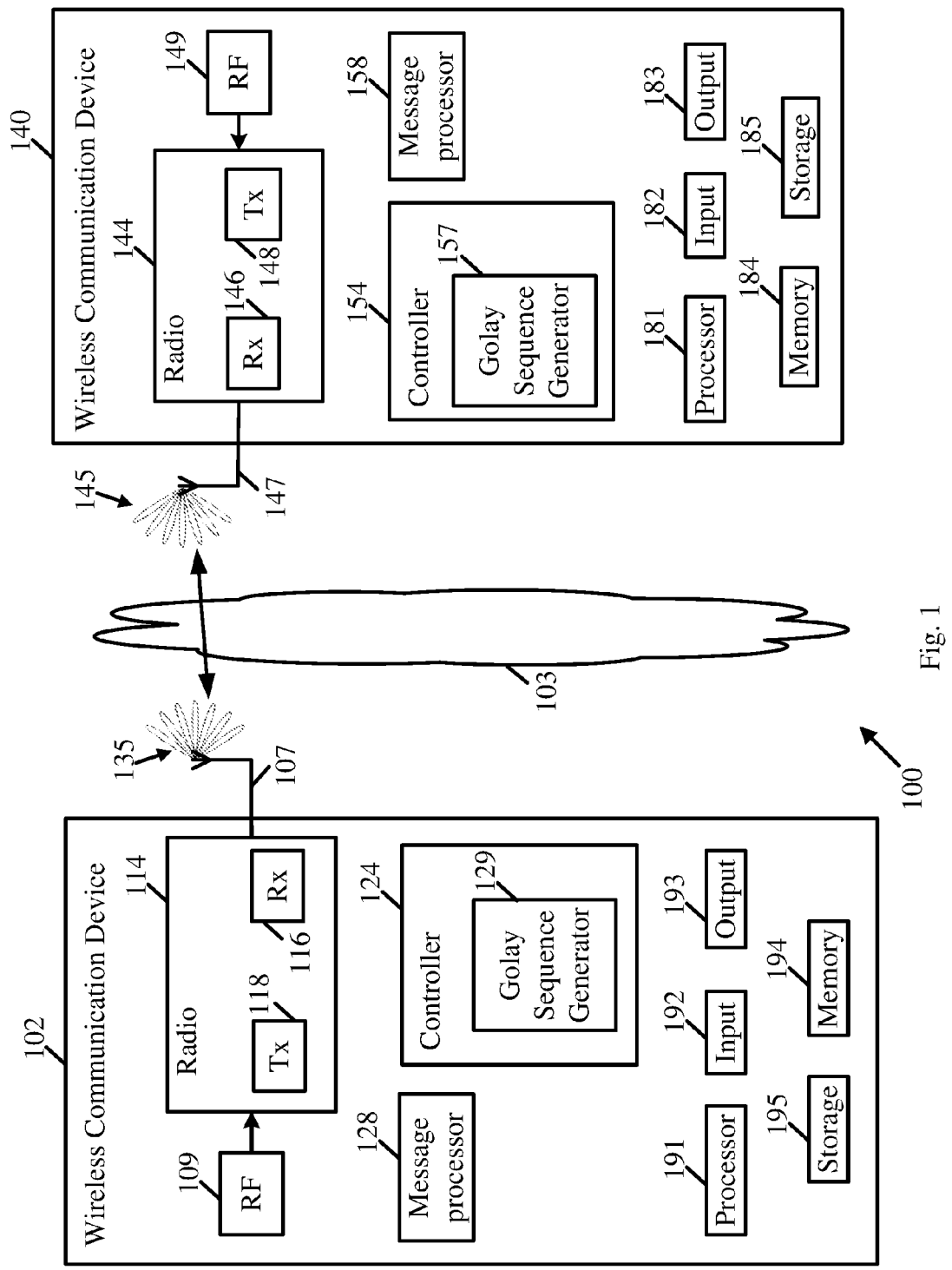
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/ D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number of rows, and an integer number of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be includes as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be includes as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more IEEE 802.11 Specifications, e.g., an IEEE 802.11ad Specification, an IEEE 802.11REVmc Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps or more, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

Some wireless communication specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices. For example, device 102 may be configured to transmit a MIMO transmission to one or more devices, e.g., including device 140. In one example, device 102 may transmit a MU-MIMO transmission to a plurality of devices, e.g., including device 140.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, a MU DL MIMO transmission may include a DL transmission from a station, e.g., device 102, to a plurality of stations, e.g., a plurality of stations including device 140, for example, at least partially simultaneously.

In some demonstrative embodiments, a MU UL MIMO transmission may include an UL transmission from a plurality of stations, e.g., including device 140, to a station, e.g., device 102, for example, at least partially simultaneously.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, e.g., according to a channel bonding factor of two, a channel BW of 6.48 GHz, e.g., according to a channel bonding factor of four, and/or any other additional or alternative channel BW.

Some communication schemes, for example, in accordance with an IEEE 802.11ad Specification, may implement first and second Golay complementary sequences, e.g., the Golay sequences Ga and Gb, to define a Short Training Field (STF) and a Channel Estimation Filed (CEF) of a packet preamble. For example, the STF field may be configured to be used by a receiver of a packet, for packet detection, carrier frequency offset estimation, noise power estimation, synchronization, Automatic Gain Control (AGC) setup, and/or one or more other additional or alternative signal estimations. For example, the CEF may be configured to be used by the receiver of the packet for channel estimation, e.g., in a time domain and/or a frequency domain.

In some demonstrative embodiments, devices 102 and/or 140 may be configured to generate, encode, transmit, detect, receive, process, and/or decode, one or more transmissions, which may include one or more fields, which may utilize one or more extensions of Golay sequences, for example, extensions of the Golay sequences Ga and/or Gb, e.g., as described below.

In some demonstrative embodiments, the fields utilizing the one or more extensions of Golay sequences, for example, the extensions of the Golay sequences Ga and/or Gb, may include, for example, STF fields, CEF fields, and/or one or more guard interval (GI) fields, e.g., as described below. In other embodiments, any other additional or alternative fields may be configured utilizing the one or more extensions of Golay sequences.

In some demonstrative embodiments, devices 102 and/or 140 may be configured to generate, encode, transmit, detect, receive, process, and/or decode, one or more EDMG transmissions, e.g., including EDMG packets, which may include one or more fields, for example, an EDMG STF (EDMG-STF), an EDMG CEF (EDMG-CEF), and/or an EDMG guard interval, e.g., an EDMG Single Carrier (SC) guard interval, which may utilize one or more extensions of Golay sequences, for example, extensions of the Golay sequences Ga and/or Gb, e.g., as described below.

In some demonstrative embodiments, devices 102 and/or 140 may be configured to generate, encode, transmit, detect, receive, process, and/or decode, one or more transmissions, for example EDMG transmissions, e.g., including EDMG packets, which may include one or more fields, for example, EDMG-STF and/or EDMG-CEF, which may utilize one or more Golay Sequence Sets (GSS), e.g., as described below.

In some demonstrative embodiments, devices 102 and/or 140 may be configured to generate, encode, transmit, detect, receive, process, and/or decode, the one or more field based on the GSS, e.g., as described below.

In some demonstrative embodiments, devices 102 and/or 140 may be configured to generate, encode, transmit, detect, receive, process, and/or decode, one or more fields of a physical layer convergence procedure (PLCP) protocol data unit (PPDU), e.g., EMDG PPDU, for example, using a complementary Golay sequence pair (also referred to as "complementary sequence" or a "Golay pair"), denoted $(Ga^i_N, Gb^i_N)$, wherein N denotes a sequence length, e.g., as described below.

In some demonstrative embodiments, the one or more fields of the PPDU may include, for example, an STF, e.g., EDMG-STF, a CEF, e.g., an EDMG-CEF, and/or a guard interval, e.g., an EDMG SC guard interval, e.g., as described below.

In some demonstrative embodiments, devices 102 and/or 140 may be configured to generate, encode, transmit, detect, receive, process, and/or decode, the one or more fields of the EMDG PPDU, for example, to be transmitted and/or received in a SU transmission, and/or a MU transmission, e.g., as described below.

In some demonstrative embodiments, devices 102 and/or 140 may be configured to generate, encode, transmit, detect, receive, process, and/or decode, the one or more fields of the EMDG PPDU, for example, to be transmitted and/or received over a single channel or a channel bonding, for example, of two or four channels, or a bonded channel including any other number of channels, e.g., as described below.

In some demonstrative embodiments, for example, device 102 may be configured to generate, process, encode, and/or transmit a transmission, for example, a MIMO transmission, e.g., as described below.

In some demonstrative embodiments, the MIMO transmission may include, for example, a MU MIMO transmission, which may include a plurality of spatial streams to be transmitted to a plurality of users, for example, a plurality of stations including device 140, e.g., as described below.

In some demonstrative embodiments, a stream of the plurality of spatial streams may include at least one field, which may utilize a Golay sequence pair of the GSS, e.g., as described below.

In some demonstrative embodiments, device 102 may be configured to utilize the Golay sequence pair of the GSS, for example, for at least an STF and/or a CEF of a packet in the stream, e.g., as described below. In other embodiments, device 102 may be configured to utilize the Golay sequence pair of the GSS, for example, for any other additional or alternative field in the stream.

In some demonstrative embodiments, for example, device 140 may be configured to detect, receive, process, and/or decode one or more fields of one or more spatial streams of a transmission, for example, a MIMO transmission, for example, the MIMO transmission from device, 102, e.g., as described below.

In some demonstrative embodiments, the MIMO transmission may include, for example, the MU MIMO transmission, which may include the plurality of spatial streams to the plurality of users, for example, including device 140, e.g., as described below.

In some demonstrative embodiments, device 140 may be configured to utilize a Golay sequence pair of the GSS, for example, to process at least an STF, a CEF, and/or a guard interval, of a packet in a spatial stream of the MIMO transmission, e.g., as described below. In other embodiments, device 140 may be configured to utilize the Golay sequence pair of the GSS, for example, to process any other additional or alternative field in the stream.

In some demonstrative embodiments, device 140 may be configured, for example, to utilize the Golay sequence pair of the GSS, for example, to process the STF and/or CEF, for example, for packet detection, carrier frequency offset estimation, noise power estimation, synchronization, Automatic Gain Control (AGC) setup, and/or one or more other additional or alternative operations and/or signal estimations.

In some demonstrative embodiments, a GSS may be configured to include a plurality of Golay complementary pairs, e.g., the pairs ($Ga^i_N$, $Gb^i_N$), as described below In some demonstrative embodiments, devices 102 and/or 140 may be configured to generate, encode, transmit, detect, receive, process, and/or decode, one or more transmissions based on one or more GSS including complementary Golay sequences of a length N=128, a length N=256, and/or a length N=512, e.g., as described below. In one example, the value of N may depend on a channel bonding factor, and/or one or more additional or alternative attributes and/or parameters.

In other embodiments, devices 102 and/or 140 may be configured to generate, encode, transmit, detect, receive, process, and/or decode, one or more transmissions using one or more GSS including complementary Golay sequences of any other length N.

In some demonstrative embodiments, devices 102 and/or 140 may be configured to generate Golay sequences, e.g., the Golay complementary pairs of a GSS, for example, using a Golay sequence generator having a structure, e.g., in accordance with an IEEE 802.11ad Specification and/or any other structure and/or in accordance with any other Specification.

In some demonstrative embodiments, controller 124 may include, operate as, and/or perform one or more functionalities of, a Golay sequence generator 129 configured to generate Golay complementary pairs of a GSS, e.g., as described below.

In some demonstrative embodiments, controller 154 may include, operate as, and/or perform one or more functionalities of, a Golay sequence generator 157 configured to generate Golay complementary pairs of a GSS, e.g., as described below.

In some demonstrative embodiments, the Golay sequences, e.g., the Golay complementary pairs of a GSS, may be determined, defined, and/or generated, for example, according to one or more parameters, for example, a delay vector, denoted Dk, and/or a weight vector, denoted Wk, e.g., as described below.

In some demonstrative embodiments, a pair of vectors (Dk, Wk) may be set, for example, to define a Golay complementary pair, e.g., as described below.

In some demonstrative embodiments, Golay sequence generator 129 may be configured to select and/or set a pair of vectors (Dk, Wk), which may be used by device 102 to generate a Golay complementary pair, which may be implemented, for example, to generate one or more fields to be transmitted in a transmission from device 102, e.g., as described below.

In some demonstrative embodiments, Golay sequence generator 157 may be configured to select and/or set a pair of vectors (Dk, Wk), which may be used by device 140 to generate a Golay complementary pair, which may be implemented, for example, to process one or more fields to be received in a transmission at device 140, e.g., as described below.

In some demonstrative embodiments, Golay sequence generator 129 and/or Golay sequence generator 157 may be configured to define, generate, and/or use, a GSS, which may include a plurality of complementary Golay sequence pairs. For example, the GSS may include M complementary Golay sequence pairs, denoted ($Ga^i$, $Gb^i$), wherein i=1 . . . M, e.g., as described below. For example, the GSS of the length N may include M complementary Golay sequence pairs ($Ga^i_N$, $Gb^i_N$), wherein i=1 . . . M, e.g., as described below.

In some demonstrative embodiments, the complementary Golay sequence pairs ($Ga^i$, $Gb^i$) of the GSS may be configured to satisfy a complementary property, for example, such that a sum of autocorrelation functions is equal to unity, e.g., $Ga^i \times Ga^i + Gb^i \times Gb^i = 1$, wherein "×" denotes circular convolution.

In some demonstrative embodiments, Golay sequence generator 129 and/or Golay sequence generator 157 may be configured to define, generate, and/or use, a GSS, for example, such that all sequences in the GSS are orthogonal to each other, for example, such that the scalar products ($Ga^i$, $Ga^j$)=0, ($Gb^i$, $Gb^j$)=0, ($Ga^i$, $Gb^j$)=0 for any i≠j.

In some demonstrative embodiments, Golay sequence generator 129 and/or Golay sequence generator 157 may be configured to define, generate, and/or use, a GSS, for example, such that each complementary pair in the set ($Ga^i$, $Gb^i$) may have a Zero Cross Correlation (ZCC) counterpart ($Ga^i$, $Gb^i$), e.g., such that $Ga^i \times Ga^j + Gb^i \times Gb^j = 0$, where $i \neq j$.

In some demonstrative embodiments, Golay sequence generator 129 and/or Golay sequence generator 157 may be configured to define, generate, and/or use, a GSS, which may, for example, include a Golay pair ("the core pair") of the length N, for example, a pair of Golay sequences in compliance with an IEEE 802.11ad Specification. In other embodiments, any other pair of Golay sequences may be defined as the core pair of a GSS.

In some demonstrative embodiments, Golay sequence generator 129 and/or Golay sequence generator 157 may be configured to define, generate, and/or use, a GSS, for example, based on a delay vector, which may be based, for example, on the length N, for example, in compliance with an IEEE 802.11ad Specification, e.g., as described below. In one example, for the length N=128, a GSS may be determined, for example, based on the delay vector Dk=[1, 8, 2, 4, 16, 32, 64]. In other embodiments, any other additional or alternative delay vector may be used to define the GSS.

In some demonstrative embodiments, Golay sequence generator 129 and/or Golay sequence generator 157 may be configured to define, generate, and/or use, a GSS, for example, such that a number or count of the values +1/−1 may be the same as the number or count in the core pair of sequences.

In some demonstrative embodiments, Golay sequence generator 129 and/or Golay sequence generator 157 may be configured to define, generate, and/or use, a GSS, for example, such that each complementary pair in the GSS may have similar characteristics, for example, autocorrelation, and/or Peak to Total Power Ratio (PAPR) at an output of shape filter, and the like.

In some demonstrative embodiments, Golay sequence generator 129 and/or Golay sequence generator 157 may be configured to define, generate, and/or use, a GSS, for example, based on the delay vector, while, for example, using a plurality of weight vectors Wk, e.g., as described below.

In some demonstrative embodiments, Golay sequence generator 129 and/or Golay sequence generator 157 may be configured to define, generate, and/or use, a GSS corresponding to the length N and the delay vector Dk, for example, based on a plurality of Weight vectors Wk, for example, a set of M Weight vectors corresponding to the M Golay pairs, e.g., as described below.

In some demonstrative embodiments, Golay sequence generator 129 and/or Golay sequence generator 157 may be configured to define, generate, and/or use a plurality of Weight vectors Wk corresponding to a GSS, for example, based on a core pair of sequences of the GSS, e.g., as described below. In other embodiments, the plurality of weight vectors Wk may be based on any other additional or alternative parameter and/or criterion.

In some demonstrative embodiments, Golay sequence generator 129 and/or Golay sequence generator 157 may be configured to define, generate, and/or use a plurality of weight vectors Wk, which may be based on the core pair of sequences of the GSS, e.g., including a Golay complementary pair corresponding to the length N and the delay vector Dk, for example, while satisfying one or more requirements for the GSS, e.g., all the requirements for the GSS, as discussed above.

In some demonstrative embodiments, devices 102 and/or 140 may be configured to determine, generate, process and/or use one or more GSS, which may be configured for the sequence lengths N=128, 256, and/or 512, for example, for EDMG-STF and/or EDMG-CEF fields to be utilized in a MIMO transmission, e.g., as described below. In other embodiments, devices 102 and/or 140 may be configured to determine, generate, process and/or use one or more other additional or alternative GSS, e.g., configured with respect to any other additional or alternative sequence lengths N, and/or to be used in any other additional or alternative type of fields and/or transmissions.

In some demonstrative embodiments, devices 102 and/or 140 may be configured to determine, generate, process and/or use one or more GSS, which may be configured for a MIMO transmission including more than 8 streams, e.g., as described below.

In one example, a GSS defined for a GSS size of M=8 may be configured to support MIMO transmissions with up to 8 streams, e.g., a Single User (SU) MIMO transmission utilizing up to 8 streams. However, some MIMO transmissions, for example, a Multi User (MU) MIMO transmission may utilize a number of streams which is greater than 8, for example, at least 9 streams and up to 16 streams, or any other number of streams, e.g., even more than 16 streams.

In some demonstrative embodiments, devices 102 and/or 140 may be configured to determine, generate, process and/or use one or more GSS, which may be configured to support a MIMO transmission including more that 8 streams, for example, a MU transmission with at least 9 streams and up to 16 streams, or any other number of streams, for example, even more than 16 streams, e.g., as described below.

In some demonstrative embodiments, a GSS defined for 8 streams may be extended to support a larger number of streams, e.g., from 9 to 16 streams, or any other number of streams, e.g., even more than 16 streams.

In some demonstrative embodiments, devices 102 and/or 140 may be configured to generate an extension of a GSS including eight complementary Golay sequence pairs, for example, to support more than 8 streams, e.g., as described below.

In some demonstrative embodiments, devices 102 and/or 140 may be configured to generate an extension of the GSS including eight complementary Golay sequence pairs, for example, by defining one or more additional weight vectors Wk to be used for generating one or more additional complementary Golay sequence pairs, e.g., as described below.

In some demonstrative embodiments, devices 102 and/or 140 may be configured to generate an extension of the GSS including eight complementary Golay sequence pairs, for example, to extend the GSS to sixteen complementary Golay sequence pairs, by defining eight additional weight vectors Wk for generating eight additional complementary Golay sequence pairs, e.g., as described below. In other embodiments, any other number of additional weight vectors Wk may be defined to extend the GSS by any other number of complementary Golay sequence pairs, e.g., less or more than eight additional complementary Golay sequence pairs.

In some demonstrative embodiments, devices 102 and/or 140 may be configured to generate an extension of Golay Sequence Sets for the length N=128, N=256 and/or N=512, e.g., as described below. In other embodiments, one or more GSS of any other additional or alternative length N may be extended.

In some demonstrative embodiments, a wireless station, e.g., a wireless station implemented by device 102 and/or a wireless station implemented by device 140, may be configured to generate a GSS including a plurality of complementary Golay sequence pairs based on a plurality of weight vectors Wk, which may be configured to include one or more weight vectors corresponding to one or more respective stream numbers, which are equal to or greater than 9, e.g., as described below.

In some demonstrative embodiments, the wireless station, e.g., the wireless station implemented by device 102 and/or the wireless station implemented by device 140, may be configured to transmit a MIMO transmission, for example, a MU MIMO transmission, e.g., an EDMG MU MIMO transmission, over a plurality of spatial streams. For example, the MIMO transmission may include at least one field transmitted over a spatial stream having a stream number equal to or greater than 9, and the field may be based on a complementary Golay sequence pair, which is based on a weight vector corresponding to the stream number, e.g., as described below.

In some demonstrative embodiments, the wireless station, e.g., the wireless station implemented by device 102 and/or the wireless station implemented by device 140, may be configured to receive and/or process one or more streams of a MIMO transmission, for example, a MU MIMO transmission, e.g., an EDMG MU MIMO transmission, which may be communicated over a plurality of spatial streams. For example, the wireless station, e.g., the wireless station implemented by device 102 and/or the wireless station implemented by device 140, may be configured to receive and/or process at least one field over a spatial stream having a stream number equal to or greater than 9, for example, based on a complementary Golay sequence pair, which is based on a weight vector corresponding to the stream number, e.g., as described below.

In some demonstrative embodiments, Golay sequence generator 129 and/or Golay sequence generator 157 may be configured to generate the sequences ($Ga^i_N$, $Gb^i_N$) of the GSS for the length N, for example, based on a delay vector Dk and a weight vector Wk corresponding to the length N, e.g., as described below.

In some demonstrative embodiments, Golay sequence generator 129 and/or Golay sequence generator 157 may be configured to determine the value of the delay vector Dk to be utilized for generating Golay sequences of a GSS, e.g., EDMG Golay sequences, for example, based on the length value N, e.g., as follows:

For N=128: Dk=[1 8 2 4 16 32 64];
For N=256: $D_K$=[1 8 2 4 16 32 64 128]; and/or
For N=512: $D_K$=[1 8 2 4 16 32 64 128 256].

For example, Golay sequence generator 129 and/or Golay sequence generator 157 may be configured to determine a GSS of length N=128, for example, including a plurality of complementary sequence pairs, e.g., the complementary sequence pairs $Ga^i_{128}$ and $Gb^i_{128}$, for example, based on the delay vector Dk=[1 8 2 4 16 32 64].

For example, Golay sequence generator 129 and/or Golay sequence generator 157 may be configured to determine a GSS of length N=256, for example, including a plurality of complementary sequence pairs, e.g., the complementary sequence pairs $Ga^i_{256}$ and $Gb^i_{256}$, for example, based on the delay vector DK=[1 8 2 4 16 32 64 128].

For example, Golay sequence generator 129 and/or Golay sequence generator 157 may be configured to determine a GSS of length N=512, for example, including a plurality of complementary sequence pairs, e.g., the complementary sequence pairs $Ga^i_{512}$ and $Gb^i_{512}$, for example, based on the delay vector DK=[1 8 2 4 16 32 64 128 256].

In other embodiments, the value of the delay vector Dk may be defined in any other manner and/or with respect to any additional or alternative length N.

In some demonstrative embodiments, devices 102 and/or 140 may be configured to generate a GSS including more than 8 Golay sequences, for example, between 9 and 16 Golay sequences, e.g., EDMG Golay sequences ("EDMG sequences"), or any other number of sequences, e.g., even more than 16 Golay sequences.

In some demonstrative embodiments, devices 102 and/or 140 may be configured to generate, encode, transmit, detect, receive and/or process a transmission, for example, an EDMG transmission, for example, a MIMO transmission, e.g., a MU MIMO transmission, including one or more fields, for example, an EDMG-STF and/or an EDMG-CEF, configured according to the EDMG sequences.

In some demonstrative embodiments, devices 102 and/or 140 may be configured to define an EDMG sequence to be applied for a spatial stream of the MIMO transmission, for example, based on a number of the spatial stream, e.g., as described below.

In some demonstrative embodiments, devices 102 and/or 140 may be configured to define the EDMG sequence to be applied for the spatial stream of the MIMO transmission, for example, based on a Weight vector Wk corresponding to the number of the spatial stream, e.g., as described below.

In some demonstrative embodiments, one or more values of the weight vector Wk for each of the EDMG sequences for the spatial stream numbers 9-16 may be defined, e.g., based on one or more of the following weight vectors:

TABLE 1

| Spatial stream number | $W_K$ vector for 128 sequence length | $W_K$ vector for 256 sequence length | $W_K$ vector for 512 sequence length |
|---|---|---|---|
| 9 | [−1,−1,+1, −1,−1,+1,−1] | [−1,−1,+1,−1, −1,+1,−1,−1] | [−1,−1,−1,−1, +1,−1,+1,+1,−1] |
| 10 | [+1,−1,+1, −1,−1,+1,−1] | [+1,−1,+1,−1, −1,+1,−1,−1] | [+1,−1,−1,−1, +1,−1,+1,+1,−1] |
| 11 | [−1,−1,+1, −1,+1,−1,+1] | [−1,−1,+1,−1, +1,−1,+1,−1] | [−1,−1,−1,−1,+1 ,+1,+1,−1,−1] |
| 12 | [+1,−1,+1, −1,+1,−1,+1] | [+1,−1,+1,−1, +1,−1,+1,−1] | [+1,−1,−1,−1, +1,+1,+1,−1,−1] |
| 13 | [−1,−1,+1, −1,+1,+1,+1] | [−1,−1,+1,−1, +1,+1,+1,−1] | [−1,−1,−1,+1, −1,−1,−1,+1,−1] |
| 14 | [+1,−1,+1, −1,+1,+1,+1] | [+1,−1,+1,−1, +1,+1,+1,−1] | [+1,−1,−1,+1, −1,−1,−1,+1,−1] |
| 15 | [−1,−1,+1, +1,−1,+1,−1] | [−1,−1,+1,+1, −1,−1,−1] | [−1,−1,−1,+1, −1,−1,+1,−1,+1] |
| 16 | [+1,−1,+1, +1,−1,+1,−1] | [+1,−1,+1,+1, −1,+1,−1,−1] | [+1,−1,−1,+1, −1,−1,+1,−1,+1] |

For example, the values of the weight vectors Wk of Table 1 may be implemented to generate Golay sequences to extend a GSS from a GSS size of 8 to a GSS size of 16, e.g., to support up to 16 space-time streams.

In some demonstrative embodiments, controller 124 and/or controller 154 may be configured to determine a value of the weight vector Wk to be used to define a Golay pair ($Ga^i_N$, $Gb^i_N$) corresponding to the sequence length N, for example, to be used for an i-th stream, e.g., wherein i denotes the number of the stream, for example, according to Table 1.

In some demonstrative embodiments, the Table 1 may be further extended, for example, to include one or more additional weight vectors Wk, for example, to generate one or more additional Golay sequences, e.g., to support MIMO transmissions with even more than 16 streams.

In some demonstrative embodiments, for example, the Golay pairs ($Ga^i_N$, $Gb^i_N$) of a GSS may be defined, for example, based on the delay vector Dk, e.g., as defined above according to N, and the weight vector, e.g., according to Table 1, for example, using a recursive procedure, e.g., in compliance with an IEEE 802.11ad Specification and/or any other Specification, for example, as follows:

$$A_0(n)=\delta(n)$$

$$B_0(n)=\delta(n)$$

$$A_k(n)=W_k A_{k-1}(n)+B_{k-1}(n-D_k)$$

$$B_k(n)=W_k A_{k-1}(n)-B_{k-1}(n-D_k) \quad (1)$$

In some demonstrative embodiments, for example, the Golay pairs ($Ga^i_N$, $Gb^i_N$) of a GSS having the length N, e.g., when N is a power of 2, may be determined, for example, based on the values of Wk from Table 1, e.g., as follows:

$$Ga^i_N(n)=A_{log_2(N)}(N-n);$$

$$Gb^i_N(n)=B_{log_2(N)}(N-n),$$

while:

Dk is selected according to the value of N;

Wk is selected per value of $i$ and N, e.g., per Table 1 (2)

For example, the Golay pairs ($Ga^i_{128}$, $Gb^i_{128}$) of a GSS having N=128 may be determined, for example, based on the values of Wk from Table 1, e.g., as follows:

$$Ga^i_{128}(n)=A_7(128-n);$$

$$Gb^i_{128}(n)=B_7(128-n),$$

while:

Dk=[1 8 2 4 16 32 64];

Wk is selected per value of $i$, e.g., per Table 1 (3)

For example, the Golay pairs ($Ga^i_{256}$, $Gb^i_{256}$) of a GSS having N=256 may be determined, for example, based on the values of Wk from Table 1, e.g., as follows:

$$Ga^i_{256}(n)=A_8(256-n);$$

$$Gb^i_{256}(n)=B_8(256-n),$$

while:

Dk=[1 8 2 4 16 32 64 128];

Wk is selected per value of $i$, e.g., per Table 1 (4)

For example, the Golay pairs ($Ga^i_{512}$, $Gb^i_{512}$) of a GSS having N=512 may be determined, for example, based on the values of Wk from Table 1, e.g., as follows:

$$Ga^i_{512}(n)=A_9(512-n);$$

$$Gb^i_{512}(n)=B_9(512-n),$$

while:

Dk=[1 8 2 4 16 32 64 128 256];

Wk is selected per value of $i$, e.g., per Table 1 (5)

In some demonstrative embodiments, controller 124 may be configured to control, trigger and/or cause a wireless station implemented by device 102 to generate a GSS including a plurality of complementary Golay sequence pairs based on a plurality of weight vectors including one or more weight vectors corresponding to one or more respective stream numbers, which are equal to or greater than 9.

For example, controller 124 may be configured to control, trigger and/or cause the wireless station implemented by device 102 to generate a GSS including one or more complementary Golay sequence pairs based on one or more of the Weight vectors Wk of Table 1, e.g., as described above.

In some demonstrative embodiments, controller 124 may be configured to control, trigger and/or cause the wireless station implemented by device 102 to generate the plurality of complementary Golay sequence pairs based on the plurality of weight vectors and a delay vector, e.g., the delay vector Dk, which is based on a sequence length N of the Golay sequence pairs, e.g., as described above.

In some demonstrative embodiments, controller 124 may be configured to control, trigger and/or cause the wireless station implemented by device 102 to transmit a MIMO transmission over a plurality of spatial streams, e.g., as described above.

In some demonstrative embodiments, the plurality of spatial streams may include, for example, between nine and sixteen streams, e.g., as described above. In other embodiments, the plurality of spatial streams may include any other number of streams.

In some demonstrative embodiments, the MIMO transmission may include at least one field transmitted over a spatial stream having a stream number equal to or greater than 9, and controller 124 may cause the wireless station to generate the field based on a complementary Golay sequence pair of the plurality of complementary Golay sequence pairs, which is based on a weight vector corresponding to the stream number.

For example, controller 124 may be configured to cause the wireless station implemented by device 102 to generate the Golay pair ($Ga^i_N$, $Gb^i_N$) based on a Weight vector Wk of Table 1 corresponding to the stream number i and the sequence length N, e.g., as described above.

In some demonstrative embodiments, the at least one field may include, for example, an STF, e.g., an EDMG-STF, a CEF, e.g., an EDMG-CEF, a guard interval, e.g., an EDMG SC guard interval, and/or any other additional or alternative field, e.g., as described above.

In some demonstrative embodiments, the MIMO transmission may include a MU MIMO transmission, e.g., as described above. In other embodiments, the MIMO transmission may include a SU transmission.

In some demonstrative embodiments, the one or more weight vectors may include a plurality of weight vectors corresponding to a respective plurality of stream numbers, which are between 9 and 16, for example, including one or more of the weight vectors of Table 1, e.g., as described above.

In some demonstrative embodiments, the one or more weight vectors are based on the sequence length N of the Golay sequence pairs, for example, the sequence length N of 128, 256, or 512, e.g., as described above.

In some demonstrative embodiments, controller 154 may be configured to control, trigger and/or cause a wireless station implemented by device 140 to select a complementary Golay sequence pair from a GSS, for example, based on a stream number of a spatial stream of a MIMO transmission over a plurality of spatial streams. For example, controller 154 may be configured to control, trigger and/or cause the wireless station implemented by device 140 to select the Golay pair ($Ga^i_N$, $Gb^i_N$) based on the stream number i, for example, of a spatial stream of the MIMO transmission from device 102, e.g., as described above.

In some demonstrative embodiments, the stream number may be equal to or greater than 9, and the GSS may include a plurality of complementary Golay sequence pairs based on a plurality of weight vectors including one or more weight vectors corresponding to one or more respective stream numbers, which are equal to or greater than 9. For example, the GSS may include a plurality of complementary Golay sequence pairs, which may be defined based on one or more of the weight vectors Wk of Table 1, e.g., as described above.

In some demonstrative embodiments, controller 154 may be configured to control, trigger and/or cause the wireless station implemented by device 140 to process at least one field of the spatial stream based on the complementary Golay sequence pair. For example, controller 154 may be configured to control, trigger and/or cause the wireless station implemented by device 140 to process an STF, e.g., an EDMG-STF, a CEF, e.g., an EDMG-CEF, a guard interval, e.g., an EDMG SC guard interval, and/or any other additional or alternative field, of the spatial stream having the stream number i, for example, based on the Golay pair ($Ga^i_N$, $Gb^i_N$), e.g., as described above.

Figure 2:
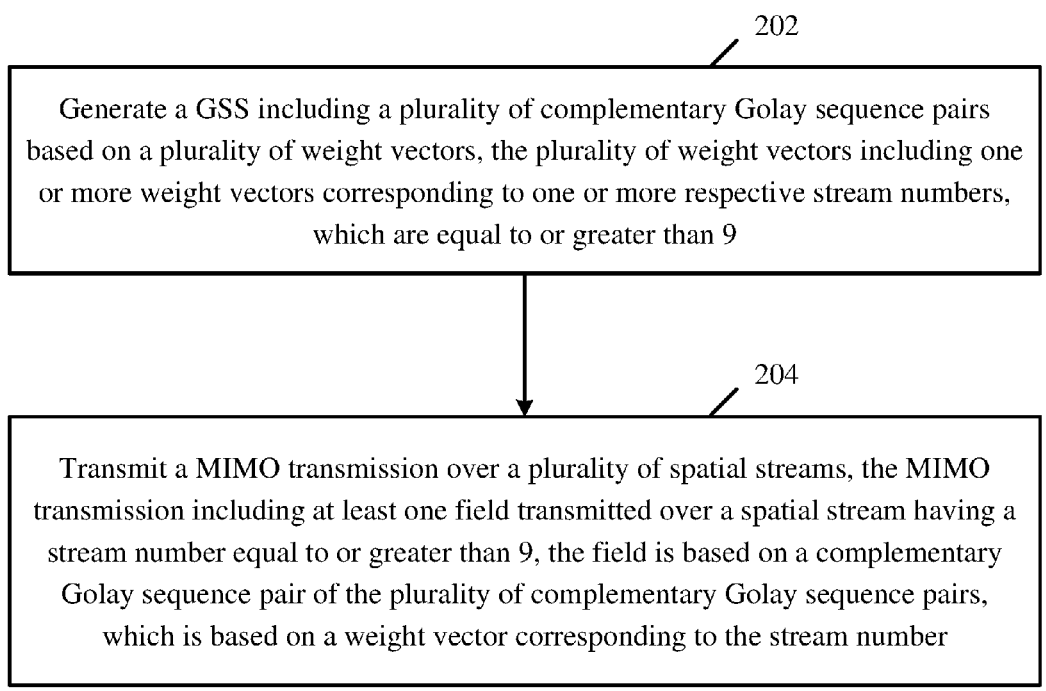
FIG. 2 is a schematic flow-chart illustration of a method of communicating a Multiple-Input-Multiple-Output (MIMO) transmission with Golay Sequence Set (GSS), in accordance with some demonstrative embodiments.

Reference is made to FIG. 2, which schematically illustrates a method of communicating a MIMO transmission with GSS, in accordance with some demonstrative embodiments. For example, one or more of the operations of the method of FIG. 2 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a Golay sequence generator, e.g., Golay sequence generator 129 (FIG. 1); and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 202, the method may include generating a GSS including a plurality of complementary Golay sequence pairs based on a plurality of weight vectors, the plurality of weight vectors including one or more weight vectors corresponding to one or more respective stream numbers, which are equal to or greater than 9. For example, Golay sequence generator 129 (FIG. 1) may generate the GSS including the plurality of complementary Golay sequence pairs based on a plurality of weight vectors including one or more weight vectors Wk corresponding to a stream number i, which is equal to or greater than 9, e.g., as described above.

As indicated at block 204, the method may include transmitting a MIMO transmission over a plurality of spatial streams, the MIMO transmission including at least one field transmitted over a spatial stream having a stream number equal to or greater than 9, the field is based on a complementary Golay sequence pair of the plurality of complementary Golay sequence pairs, which is based on a weight vector corresponding to the stream number. For example, controller 124 (FIG. 1) may cause the wireless station implemented by device 102 (FIG. 1) to transmit a MIMO transmission, and to determine a field to be transmitted over the stream with the stream number i equal to or greater than 9, based on the weight vector Wk corresponding to the stream number i, e.g., as described above.

Figure 3:
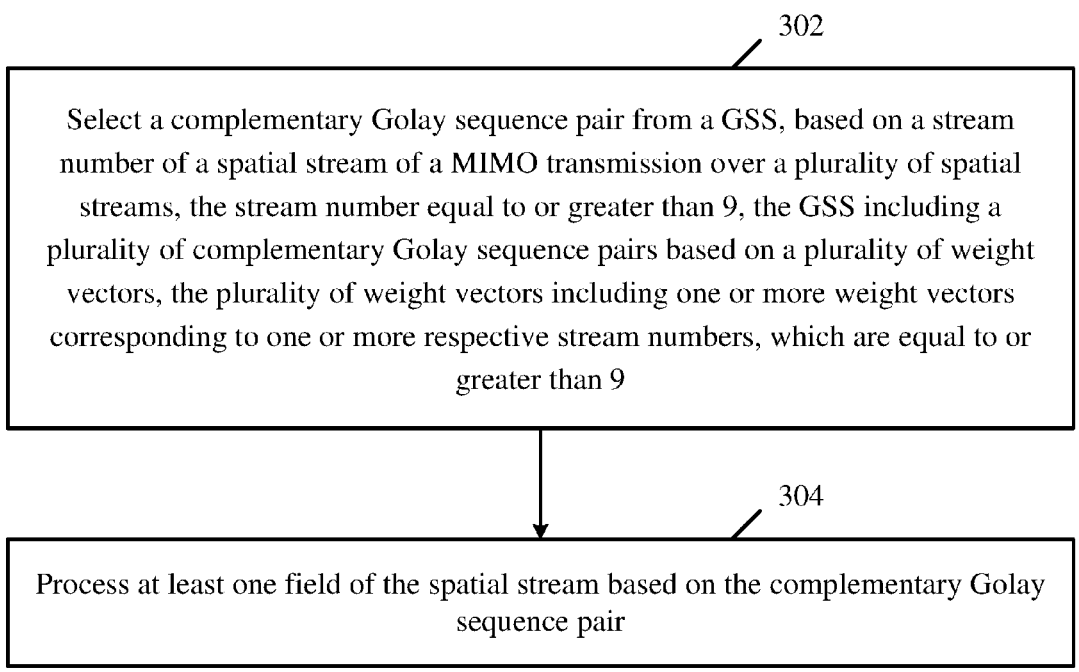
FIG. 3 is a schematic flow-chart illustration of a method of communicating a MIMO transmission with GSS, in accordance with some demonstrative embodiments.

Reference is made to FIG. 3, which schematically illustrates a method of communicating a MIMO transmission with GSS, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a Golay sequence generator, e.g., Golay sequence generator 129 (FIG. 1); and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 302, the method may include selecting a complementary Golay sequence pair from a GSS, based on a stream number of a spatial stream of a MIMO transmission over a plurality of spatial streams, the stream number equal to or greater than 9, the GSS including a plurality of complementary Golay sequence pairs based on a plurality of weight vectors, the plurality of weight vectors including one or more weight vectors corresponding to one or more respective stream numbers, which are equal to or greater than 9. For example, controller 154 (FIG. 1) may cause the wireless station implemented by device 140 (FIG. 1) to select a complementary Golay sequence pair from a GSS, e.g., the Golay pair ($Ga^i_N$, $Gb^i_N$), based on the stream number i, which is equal to or greater than 9, of a spatial stream of a MIMO transmission over a plurality of spatial streams, for example, the MIMO transmission from device 102 (FIG. 1), e.g., as described above. For example, Golay sequence generator 157 (FIG. 1) may generate the GSS based on one or more of the weight vectors Wk of Table 1, e.g., as described above.

As indicated at block 304, the method may include processing at least one field of the spatial stream based on the complementary Golay sequence pair. For example, controller 154 (FIG. 1) may cause the wireless station implemented by device 140 (FIG. 1) to process one or more fields of the i-th spatial stream based on the Golay pair ($Ga^i_N$, $Gb^i_N$), e.g., as described above.

Figure 4:
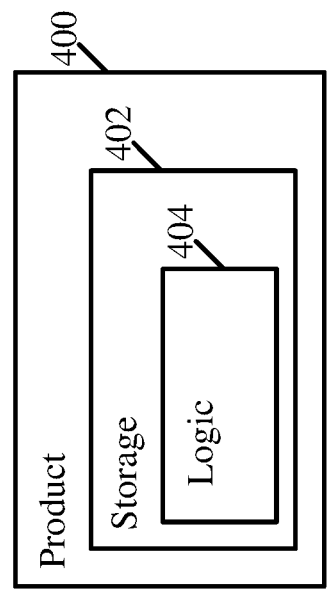
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable non-transitory storage media 402, which may include computer-executable instructions, e.g., implemented by logic 404, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), Golay sequence generator 129 (FIG. 1), Golay sequence generator 157 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), Golay sequence generator 129 (FIG. 1), Golay sequence generator 157 (FIG. 1), message processor 128 (FIG. 1), and/or message processor 158 (FIG. 1), to perform one or more operations, and/or to perform, trigger and/or implement one or more operations, communications and/or functionalities described above with reference to FIGS. 1, 2, and/or 3, and/or one or more operations described herein. The phrase "non-transitory machine-readable medium" is directed to include all computer-readable media, with the sole exception being a transitory propagating signal.

In some demonstrative embodiments, product 400 and/or storage media 402 may include one or more types of computer-readable storage media capable of storing data, including volatile memory, non-volatile memory, removable or non-removable memory, erasable or non-erasable memory, writeable or re-writeable memory, and the like. For example, machine-readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising logic and circuitry configured to cause a wireless station to generate a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and transmit a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of the plurality of complementary Golay sequence pairs, which is based on a weight vector corresponding to the stream number.

Example 2 includes the subject matter of Example 1, and optionally, wherein the one or more weight vectors comprise a plurality of weight vectors corresponding to a respective plurality of stream numbers, which are between 9 and 16.

Example 3 includes the subject matter of Example 1 or 2, and optionally, wherein the one or more weight vectors are based on a sequence length N of the Golay sequence pairs.

Example 4 includes the subject matter of Example 3, and optionally, wherein the sequence length N is 128, 256, or 512.

Example 5 includes the subject matter of any one of Examples 1-4, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9  | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 6 includes the subject matter of any one of Examples 1-5, and optionally, wherein the apparatus is configured to cause the wireless station to generate the plurality of complementary Golay sequence pairs based on the plurality of weight vectors and a delay vector, which is based on a sequence length N of the Golay sequence pairs.

Example 7 includes the subject matter of any one of Examples 1-6, and optionally, wherein the plurality of spatial streams includes between nine and sixteen streams.

Example 8 includes the subject matter of any one of Examples 1-7, and optionally, wherein the at least one field comprises at least one of a Short Training Field (STF), a Channel Estimation Field (CEF), or a guard interval.

Example 9 includes the subject matter of any one of Examples 1-8, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 10 includes the subject matter of any one of Examples 1-9, and optionally, wherein the MIMO transmission comprises a Multi-User (MU) MIMO transmission.

Example 11 includes the subject matter of any one of Examples 1-10, and optionally, wherein the wireless station is a Directional Multi-Gigabit (DMG) Station (STA).

Example 12 includes the subject matter of any one of Examples 1-11, and optionally, comprising one or more antennas, a memory, and a processor.

Example 13 includes a system of wireless communication comprising a wireless station, the wireless station comprising one or more antennas; a radio; a memory; a processor; and a controller configured to cause the wireless station to generate a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and transmit a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of the plurality of complementary Golay sequence pairs, which is based on a weight vector corresponding to the stream number.

Example 14 includes the subject matter of Example 13, and optionally, wherein the one or more weight vectors comprise a plurality of weight vectors corresponding to a respective plurality of stream numbers, which are between 9 and 16.

Example 15 includes the subject matter of Example 13 or 14, and optionally, wherein the one or more weight vectors are based on a sequence length N of the Golay sequence pairs.

Example 16 includes the subject matter of Example 15, and optionally, wherein the sequence length N is 128, 256, or 512.

Example 17 includes the subject matter of any one of Examples 13-16, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1,−1] |
| 14 | [+1,−1,+1,−1,+1,+1,+1] | [+1,−1,+1,−1,+1,+1,+1,−1] | [+1,−1,−1,+1,−1,−1,−1,+1,−1,−1] |
| 15 | [−1,−1,+1,+1,−1,+1,−1] | [−1,−1,+1,+1,−1,+1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 18 includes the subject matter of any one of Examples 13-17, and optionally, wherein the controller is configured to cause the wireless station to generate the plurality of complementary Golay sequence pairs based on the plurality of weight vectors and a delay vector, which is based on a sequence length N of the Golay sequence pairs.

Example 19 includes the subject matter of any one of Examples 13-18, and optionally, wherein the plurality of spatial streams includes between nine and sixteen streams.

Example 20 includes the subject matter of any one of Examples 13-19, and optionally, wherein the at least one field comprises at least one of a Short Training Field (STF), a Channel Estimation Field (CEF), or a guard interval.

Example 21 includes the subject matter of any one of Examples 13-20, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 22 includes the subject matter of any one of Examples 13-21, and optionally, wherein the MIMO transmission comprises a Multi-User (MU) MIMO transmission.

Example 23 includes the subject matter of any one of Examples 13-22, and optionally, wherein the wireless station is a Directional Multi-Gigabit (DMG) Station (STA).

Example 24 includes a method to be performed at a wireless station, the method comprising generating a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and transmitting a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of the plurality of complementary Golay sequence pairs, which is based on a weight vector corresponding to the stream number.

Example 25 includes the subject matter of Example 24, and optionally, wherein the one or more weight vectors comprise a plurality of weight vectors corresponding to a respective plurality of stream numbers, which are between 9 and 16.

Example 26 includes the subject matter of Example 24 or 25, and optionally, wherein the one or more weight vectors are based on a sequence length N of the Golay sequence pairs.

Example 27 includes the subject matter of Example 26, and optionally, wherein the sequence length N is 128, 256, or 512.

Example 28 includes the subject matter of any one of Examples 24-27, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1,−1] |
| 14 | [+1,−1,+1,−1,+1,+1,+1] | [+1,−1,+1,−1,+1,+1,+1,−1] | [+1,−1,−1,+1,−1,−1,−1,+1,−1,−1] |
| 15 | [−1,−1,+1,+1,−1,+1,−1] | [−1,−1,+1,+1,−1,+1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 29 includes the subject matter of any one of Examples 24-28, and optionally, comprising generating the plurality of complementary Golay sequence pairs based on the plurality of weight vectors and a delay vector, which is based on a sequence length N of the Golay sequence pairs.

Example 30 includes the subject matter of any one of Examples 24-29, and optionally, wherein the plurality of spatial streams includes between nine and sixteen streams.

Example 31 includes the subject matter of any one of Examples 24-30, and optionally, wherein the at least one field comprises at least one of a Short Training Field (STF), a Channel Estimation Field (CEF), or a guard interval.

Example 32 includes the subject matter of any one of Examples 24-31, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 33 includes the subject matter of any one of Examples 24-32, and optionally, wherein the MIMO transmission comprises a Multi-User (MU) MIMO transmission.

Example 34 includes the subject matter of any one of Examples 24-33, and optionally, wherein the wireless station is a Directional Multi-Gigabit (DMG) Station (STA).

Example 35 includes a product comprising one or more tangible computer-readable non-transitory storage media comprising computer-executable instructions operable to, when executed by at least one computer processor, enable the at least one computer processor to cause a wireless station to generate a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and transmit a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of the plurality of complementary Golay sequence pairs, which is based on a weight vector corresponding to the stream number.

Example 36 includes the subject matter of Example 35, and optionally, wherein the one or more weight vectors comprise a plurality of weight vectors corresponding to a respective plurality of stream numbers, which are between 9 and 16.

Example 37 includes the subject matter of Example 35 or 36, and optionally, wherein the one or more weight vectors are based on a sequence length N of the Golay sequence pairs.

Example 38 includes the subject matter of Example 37, and optionally, wherein the sequence length N is 128, 256, or 512.

Example 39 includes the subject matter of any one of Examples 35-38, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1,−1] | [−1,−1,+1,−1,+1,−1,+1,−1] | [−1,−1,−1,−1,+1,+1,+1,+1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,+1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 40 includes the subject matter of any one of Examples 35-39, and optionally, wherein the instructions, when executed, cause the wireless station to generate the plurality of complementary Golay sequence pairs based on the plurality of weight vectors and a delay vector, which is based on a sequence length N of the Golay sequence pairs.

Example 41 includes the subject matter of any one of Examples 35-40, and optionally, wherein the plurality of spatial streams includes between nine and sixteen streams.

Example 42 includes the subject matter of any one of Examples 35-41, and optionally, wherein the at least one field comprises at least one of a Short Training Field (STF), a Channel Estimation Field (CEF), or a guard interval.

Example 43 includes the subject matter of any one of Examples 35-42, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 44 includes the subject matter of any one of Examples 35-43, and optionally, wherein the MIMO transmission comprises a Multi-User (MU) MIMO transmission.

Example 45 includes the subject matter of any one of Examples 35-44, and optionally, wherein the wireless station is a Directional Multi-Gigabit (DMG) Station (STA).

Example 46 includes an apparatus of wireless communication by a wireless station, the apparatus comprising means for generating a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and means for transmitting a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of the plurality of complementary Golay sequence pairs, which is based on a weight vector corresponding to the stream number.

Example 47 includes the subject matter of Example 46, and optionally, wherein the one or more weight vectors comprise a plurality of weight vectors corresponding to a respective plurality of stream numbers, which are between 9 and 16.

Example 48 includes the subject matter of Example 46 or 47, and optionally, wherein the one or more weight vectors are based on a sequence length N of the Golay sequence pairs.

Example 49 includes the subject matter of Example 48, and optionally, wherein the sequence length N is 128, 256, or 512.

Example 50 includes the subject matter of any one of Examples 46-49, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1] |
| 13 | [−1,−1,+1,−1,+1,+1,+1] | [−1,−1,+1,−1,+1,−1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,+1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 51 includes the subject matter of any one of Examples 46-50, and optionally, comprising means for generating the plurality of complementary Golay sequence pairs based on the plurality of weight vectors and a delay vector, which is based on a sequence length N of the Golay sequence pairs.

Example 52 includes the subject matter of any one of Examples 46-51, and optionally, wherein the plurality of spatial streams includes between nine and sixteen streams.

Example 53 includes the subject matter of any one of Examples 46-52, and optionally, wherein the at least one field comprises at least one of a Short Training Field (STF), a Channel Estimation Field (CEF), or a guard interval.

Example 54 includes the subject matter of any one of Examples 46-53, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 55 includes the subject matter of any one of Examples 46-54, and optionally, wherein the MIMO transmission comprises a Multi-User (MU) MIMO transmission.

Example 56 includes the subject matter of any one of Examples 46-55, and optionally, wherein the wireless station is a Directional Multi-Gigabit (DMG) Station (STA).

Example 57 includes an apparatus comprising logic and circuitry configured to cause a wireless station to based on a stream number of a spatial stream of a Multiple-Input-Multiple-Output (MIMO) transmission over a plurality of spatial streams, select a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and process at least one field of the spatial stream based on the complementary Golay sequence pair.

Example 58 includes the subject matter of Example 57, and optionally, wherein the one or more weight vectors comprise a plurality of weight vectors corresponding to a respective plurality of stream numbers, which are between 9 and 16.

Example 59 includes the subject matter of Example 57 or 58, and optionally, wherein the one or more weight vectors are based on a sequence length N of the Golay sequence pairs.

Example 60 includes the subject matter of Example 59, and optionally, wherein the sequence length N is 128, 256, or 512.

Example 61 includes the subject matter of any one of Examples 57-60, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,+1,−1,−1] | [−1,−1,−1,+1,−1,−1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 62 includes the subject matter of any one of Examples 57-61, and optionally, wherein the plurality of complementary Golay sequence pairs is based on the plurality of weight vectors and a delay vector, which is based on a sequence length N of the Golay sequence pairs.

Example 63 includes the subject matter of any one of Examples 57-62, and optionally, wherein the plurality of spatial streams includes between nine and sixteen streams.

Example 64 includes the subject matter of any one of Examples 57-63, and optionally, wherein the at least one field comprises at least one of a Short Training Field (STF), a Channel Estimation Field (CEF), or a guard interval.

Example 65 includes the subject matter of any one of Examples 57-64, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 66 includes the subject matter of any one of Examples 57-65, and optionally, wherein the MIMO transmission comprises a Multi-User (MU) MIMO transmission.

Example 67 includes the subject matter of any one of Examples 57-66, and optionally, wherein the wireless station is a Directional Multi-Gigabit (DMG) Station (STA).

Example 68 includes the subject matter of any one of Examples 57-67, and optionally, comprising one or more antennas, a memory, and a processor.

Example 69 includes a system of wireless communication comprising a wireless station, the wireless station comprising one or more antennas; a radio; a memory; a processor; and a controller configured to cause the wireless station to, based on a stream number of a spatial stream of a Multiple-Input-Multiple-Output (MIMO) transmission over a plurality of spatial streams, select a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and process at least one field of the spatial stream based on the complementary Golay sequence pair.

Example 70 includes the subject matter of Example 69, and optionally, wherein the one or more weight vectors comprise a plurality of weight vectors corresponding to a respective plurality of stream numbers, which are between 9 and 16.

Example 71 includes the subject matter of Example 69 or 70, and optionally, wherein the one or more weight vectors are based on a sequence length N of the Golay sequence pairs.

Example 72 includes the subject matter of Example 71, and optionally, wherein the sequence length N is 128, 256, or 512.

Example 73 includes the subject matter of any one of Examples 69-72, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,+1,−1,−1] | [−1,−1,−1,−1,+1,+1,+1,−1,−1] |
| 12 | [+1,−1,+1,−1,+1,−1,+1] | [+1,−1,+1,−1,+1,+1,−1,−1] | [+1,−1,−1,−1,+1,+1,+1,−1,−1] |
| 13 | [−1,−1,+1,−1,+1,+1,−1] | [−1,−1,+1,−1,+1,+1,+1,−1] | [−1,−1,−1,+1,−1,−1,−1,+1,−1] |
| 14 | [+1,−1,+1,−1,+1,+1,−1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,−1,+1,−1] | [−1,−1,−1,+1,−1,+1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 74 includes the subject matter of any one of Examples 69-73, and optionally, wherein the plurality of complementary Golay sequence pairs is based on the plurality of weight vectors and a delay vector, which is based on a sequence length N of the Golay sequence pairs.

Example 75 includes the subject matter of any one of Examples 69-74, and optionally, wherein the plurality of spatial streams includes between nine and sixteen streams.

Example 76 includes the subject matter of any one of Examples 69-75, and optionally, wherein the at least one field comprises at least one of a Short Training Field (STF), a Channel Estimation Field (CEF), or a guard interval.

Example 77 includes the subject matter of any one of Examples 69-76, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 78 includes the subject matter of any one of Examples 69-77, and optionally, wherein the MIMO transmission comprises a Multi-User (MU) MIMO transmission.

Example 79 includes the subject matter of any one of Examples 69-78, and optionally, wherein the wireless station is a Directional Multi-Gigabit (DMG) Station (STA).

Example 80 includes an method to be performed at a wireless station, the method comprising, based on a stream number of a spatial stream of a Multiple-Input-Multiple-Output (MIMO) transmission over a plurality of spatial streams, selecting a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and processing at least one field of the spatial stream based on the complementary Golay sequence pair.

Example 81 includes the subject matter of Example 80, and optionally, wherein the one or more weight vectors comprise a plurality of weight vectors corresponding to a respective plurality of stream numbers, which are between 9 and 16.

Example 82 includes the subject matter of Example 80 or 81, and optionally, wherein the one or more weight vectors are based on a sequence length N of the Golay sequence pairs.

Example 83 includes the subject matter of Example 82, and optionally, wherein the sequence length N is 128, 256, or 512.

Example 84 includes the subject matter of any one of Examples 80-83, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,+1,−1,−1] | [−1,−1,−1,−1,+1,+1,+1,−1,−1] |
| 12 | [+1,−1,+1,−1,+1,−1,+1] | [+1,−1,+1,−1,+1,+1,−1,−1] | [+1,−1,−1,−1,+1,+1,+1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,−1,+1,−1] | [−1,−1,−1,+1,−1,+1,+1,−1,+1] |
| 16 | [+1,−1,+1,+1,−1,+1,−1] | [+1,−1,+1,+1,−1,+1,−1,−1] | [+1,−1,−1,+1,−1,−1,+1,−1,+1] |

Example 85 includes the subject matter of any one of Examples 80-84, and optionally, wherein the plurality of complementary Golay sequence pairs is based on the plurality of weight vectors and a delay vector, which is based on a sequence length N of the Golay sequence pairs.

Example 86 includes the subject matter of any one of Examples 80-85, and optionally, wherein the plurality of spatial streams includes between nine and sixteen streams.

Example 87 includes the subject matter of any one of Examples 80-86, and optionally, wherein the at least one field comprises at least one of a Short Training Field (STF), a Channel Estimation Field (CEF), or a guard interval.

Example 88 includes the subject matter of any one of Examples 80-87, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 89 includes the subject matter of any one of Examples 80-88, and optionally, wherein the MIMO transmission comprises a Multi-User (MU) MIMO transmission.

Example 90 includes the subject matter of any one of Examples 80-89, and optionally, wherein the wireless station is a Directional Multi-Gigabit (DMG) Station (STA).

Example 91 includes a product comprising one or more tangible computer-readable non-transitory storage media comprising computer-executable instructions operable to, when executed by at least one computer processor, enable the at least one computer processor to cause a wireless station to, based on a stream number of a spatial stream of a Multiple-Input-Multiple-Output (MIMO) transmission over a plurality of spatial streams, select a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and process at least one field of the spatial stream based on the complementary Golay sequence pair.

Example 92 includes the subject matter of Example 91, and optionally, wherein the one or more weight vectors comprise a plurality of weight vectors corresponding to a respective plurality of stream numbers, which are between 9 and 16.

Example 93 includes the subject matter of Example 91 or 92, and optionally, wherein the one or more weight vectors are based on a sequence length N of the Golay sequence pairs.

Example 94 includes the subject matter of Example 93, and optionally, wherein the sequence length N is 128, 256, or 512.

Example 95 includes the subject matter of any one of Examples 91-94, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [-1,-1,+1,-1,-1,+1,-1] | [-1,-1,+1,-1,-1,+1,-1,-1] | [-1,-1,-1,-1,+1,-1,+1,+1,-1] |
| 10 | [+1,-1,+1,-1,-1,+1,-1] | [+1,-1,+1,-1,-1,+1,-1,-1] | [+1,-1,-1,-1,+1,-1,+1,+1,-1] |
| 11 | [-1,-1,+1,-1,+1,-1,+1] | [-1,-1,+1,-1,+1,-1,+1,-1] | [-1,-1,-1,-1,+1,+1,+1,-1,-1] |
| 12 | [+1,-1,+1,-1,+1,-1,-1] | [+1,-1,+1,-1,+1,-1,+1,-1] | [+1,-1,-1,-1,+1,+1,+1,-1,-1] |
| 13 | [-1,-1,+1,-1,+1,+1,+1] | [-1,-1,+1,-1,+1,+1,+1,-1] | [-1,-1,-1,+1,-1,-1,-1,+1,-1] |
| 14 | [+1,-1,+1,-1,+1,+1,+1] | [+1,-1,+1,-1,+1,+1,+1,-1] | [+1,-1,-1,+1,-1,-1,-1,+1,-1] |
| 15 | [-1,-1,+1,+1,-1,+1,-1] | [-1,-1,+1,+1,-1,+1,-1,-1] | [-1,-1,-1,+1,-1,-1,+1,-1,+1] |
| 16 | [+1,-1,+1,+1,-1,+1,-1] | [+1,-1,+1,+1,-1,+1,-1,-1] | [+1,-1,-1,+1,-1,-1,+1,-1,+1] |

Example 96 includes the subject matter of any one of Examples 91-95, and optionally, wherein the plurality of complementary Golay sequence pairs is based on the plurality of weight vectors and a delay vector, which is based on a sequence length N of the Golay sequence pairs.

Example 97 includes the subject matter of any one of Examples 91-96, and optionally, wherein the plurality of spatial streams includes between nine and sixteen streams.

Example 98 includes the subject matter of any one of Examples 91-97, and optionally, wherein the at least one field comprises at least one of a Short Training Field (STF), a Channel Estimation Field (CEF), or a guard interval.

Example 99 includes the subject matter of any one of Examples 91-98, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 100 includes the subject matter of any one of Examples 91-99, and optionally, wherein the MIMO transmission comprises a Multi-User (MU) MIMO transmission.

Example 101 includes the subject matter of any one of Examples 91-100, and optionally, wherein the wireless station is a Directional Multi-Gigabit (DMG) Station (STA).

Example 102 includes an apparatus of wireless communication by a wireless station, the apparatus comprising means for, based on a stream number of a spatial stream of a Multiple-Input-Multiple-Output (MIMO) transmission over a plurality of spatial streams, selecting a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and means for processing at least one field of the spatial stream based on the complementary Golay sequence pair.

Example 103 includes the subject matter of Example 102, and optionally, wherein the one or more weight vectors comprise a plurality of weight vectors corresponding to a respective plurality of stream numbers, which are between 9 and 16.

Example 104 includes the subject matter of Example 102 or 103, and optionally, wherein the one or more weight vectors are based on a sequence length N of the Golay sequence pairs.

Example 105 includes the subject matter of Example 104, and optionally, wherein the sequence length N is 128, 256, or 512.

Example 106 includes the subject matter of any one of Examples 102-105, and optionally, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [-1,-1,+1,-1,-1,+1,-1] | [-1,-1,+1,-1,-1,+1,-1,-1] | [-1,-1,-1,-1,+1,-1,+1,+1,-1] |
| 10 | [+1,-1,+1,-1,-1,+1,-1] | [+1,-1,+1,-1,-1,+1,-1,-1] | [+1,-1,-1,-1,+1,-1,+1,+1,-1] |
| 11 | [-1,-1,+1,-1,+1,-1,+1] | [-1,-1,+1,-1,+1,-1,+1,-1] | [-1,-1,-1,-1,+1,+1,+1,-1,-1] |
| 12 | [+1,-1,+1,-1,+1,-1,+1] | [+1,-1,+1,-1,+1,-1,+1,-1] | [+1,-1,-1,-1,+1,+1,+1,-1,-1] |
| 13 | [-1,-1,+1,+1,-1,+1,+1] | [-1,-1,+1,-1,+1,+1,+1,-1] | [-1,-1,-1,+1,-1,-1,-1,+1,-1] |
| 14 | [+1,-1,+1,-1,+1,+1,+1] | [+1,-1,+1,-1,+1,+1,+1,-1] | [+1,-1,-1,+1,-1,-1,-1,+1,-1] |
| 15 | [-1,-1,+1,+1,-1,+1,-1] | [-1,-1,+1,+1,-1,+1,-1,-1] | [-1,-1,-1,+1,-1,-1,+1,-1,+1] |
| 16 | [+1,-1,+1,-1,-1,+1,-1] | [+1,-1,+1,+1,-1,+1,-1,-1] | [+1,-1,-1,+1,-1,-1,+1,-1,+1] |

Example 107 includes the subject matter of any one of Examples 102-106, and optionally, wherein the plurality of complementary Golay sequence pairs is based on the plurality of weight vectors and a delay vector, which is based on a sequence length N of the Golay sequence pairs.

Example 108 includes the subject matter of any one of Examples 102-107, and optionally, wherein the plurality of spatial streams includes between nine and sixteen streams.

Example 109 includes the subject matter of any one of Examples 102-108, and optionally, wherein the at least one field comprises at least one of a Short Training Field (STF), a Channel Estimation Field (CEF), or a guard interval.

Example 110 includes the subject matter of any one of Examples 102-109, and optionally, wherein the at least one field comprises at least one of an Extended Directional Multi-Gigabit (EDMG) Short Training Field (EDMG-STF), an EDMG Channel Estimation Field (EDMG-CEF), or a guard interval.

Example 111 includes the subject matter of any one of Examples 102-110, and optionally, wherein the MIMO transmission comprises a Multi-User (MU) MIMO transmission.

Example 112 includes the subject matter of any one of Examples 102-111, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
   generate a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and
   transmit a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of said plurality of complementary Golay sequence pairs, which is based on a weight vector corresponding to the stream number.

2. The apparatus of claim 1, wherein the one or more weight vectors comprise a plurality of weight vectors corresponding to a respective plurality of stream numbers, which are between 9 and 16.

3. The apparatus of claim 1, wherein the one or more weight vectors are based on a sequence length N of the Golay sequence pairs.

4. The apparatus of claim 3, wherein the sequence length N is 128, 256, or 512.

5. The apparatus of claim 1, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1,−1,+1,−1,−1] | [−1,−1,−1,−1,+1,−1,+1,+1,−1] |
| 10 | [+1,−1,+1,−1,−1,+1,−1] | [+1,−1,+1,−1,−1,+1,−1,−1] | [+1,−1,−1,−1,+1,−1,+1,+1,−1] |
| 11 | [−1,−1,+1,−1,+1,−1,+1] | [−1,−1,+1,−1,+1,−1,+1,−1] | [−1,−1,−1,−1,+1,+1,+1,−1,−1] |
| 12 | [+1,−1,+1,−1,+1,−1,+1] | [+1,−1,+1,−1,+1,−1,+1,−1] | [+1,−1,−1,−1,+1,+1,+1,−1,−1] |
| 13 | [−1,−1,+1,−1,+1,+1,+1] | [−1,−1,+1,−1,+1,+1,+1,−1] | [−1,−1,−1,+1,−1,−1,−1,+1,−1] |
| 14 | [+1,−1,+1,−1,+1,+1,+1] | [+1,−1,+1,−1,+1,+1,+1,−1] | [+1,−1,−1,+1,−1,−1,−1,+1,−1] |
| 15 | [−1,−1,+1,+1,−1,+1,−1] | [−1,−1,+1,+1,−1,+1,−1,−1] | [−1,−1,−1,+1,−1,+1,−1,+1,+1] |
| 16 | [+1,−1,+1,+1,−1,+1,−1] | [+1,−1,+1,+1,−1,+1,−1,−1] | [+1,−1,−1,+1,−1,+1,+1,−1,+1] |

6. The apparatus of claim 1 configured to cause the wireless station to generate the plurality of complementary Golay sequence pairs based on the plurality of weight vectors and a delay vector, which is based on a sequence length N of the Golay sequence pairs.

7. The apparatus of claim 1, wherein the plurality of spatial streams includes between nine and sixteen streams.

8. The apparatus of claim 1, wherein the at least one field comprises at least one of a Short Training Field (STF), a Channel Estimation Field (CEF), or a guard interval.

9. The apparatus of claim 1, wherein the at least one field comprises at least one of an Extended Directional Multi-Gigabit (EDMG) Short Training Field (EDMG-STF), an EDMG Channel Estimation Field (EDMG-CEF), or a guard interval.

10. The apparatus of claim 1, wherein the MIMO transmission comprises a Multi-User (MU) MIMO transmission.

11. The apparatus of claim 1, wherein the wireless station is a Directional Multi-Gigabit (DMG) Station (STA).

12. The apparatus of claim 1 comprising one or more antennas, a memory, and a processor.

13. A product comprising one or more tangible computer-readable non-transitory storage media comprising computer-executable instructions operable to, when executed by at least one computer processor, enable the at least one computer processor to cause a wireless station to:
   generate a Golay Sequence Set (GSS) comprising a plurality of complementary Golay sequence pairs based on a plurality of weight vectors, the plurality of weight vectors comprising one or more weight vectors corresponding to one or more respective stream numbers, which are equal to or greater than 9; and
   transmit a Multiple-Input-Multiple-Output (MIMO) transmission over a plurality of spatial streams, the MIMO transmission comprising at least one field transmitted over a spatial stream having a stream number equal to or greater than 9, the field is based on a complementary Golay sequence pair of said plurality of complementary Golay sequence pairs, which is based on a weight vector corresponding to the stream number.

14. The product of claim 13, wherein the one or more weight vectors comprise a plurality of weight vectors corresponding to a respective plurality of stream numbers, which are between 9 and 16.

15. The product of claim 13, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1, −1,+1,−1,−1] | [−1,−1,−1,−1, +1,−1,+1,+1,−1] |
| 10 | [+1,−1,+1,−1,−1,+1,−1] | [+1,−1,+1,−1, −1,+1,−1,−1] | [+1,−1,−1,−1, +1,−1,+1,+1,−1] |
| 11 | [−1,−1,+1,−1,+1,−1,+1] | [−1,−1,+1,−1, +1,−1,+1,−1] | [−1,−1,−1,−1, +1,+1,+1,−1,−1] |
| 12 | [+1,−1,+1,−1,+1,−1,+1] | [+1,−1,+1,−1, +1,−1,+1,−1] | [+1,−1,−1,−1, +1,+1,+1,−1,−1] |
| 13 | [−1,−1,+1,−1,+1,+1,−1] | [−1,−1,+1,−1, +1,+1,+1,−1] | [−1,−1,−1,+1, −1,−1,+1,+1,−1] |
| 14 | [+1,−1,+1,−1,+1,+1,+1] | [+1,−1,+1,−1, +1,+1,+1,−1] | [+1,−1,−1,+1, −1,−1,+1,+1,−1] |
| 15 | [−1,−1,+1,+1,−1,+1,−1] | [−1,−1,+1,+1, −1,+1,−1,−1] | [−1,−1,−1,+1, −1,−1,+1,−1,+1] |
| 16 | [+1,−1,+1,+1,−1,+1,−1] | [+1,−1,+1,+1, −1,+1,−1,−1] | [+1,−1,−1,+1, −1,−1,+1,−1,+1] |

16. The product of claim 13, wherein the instructions, when executed, cause the wireless station to generate the plurality of complementary Golay sequence pairs based on the plurality of weight vectors and a delay vector, which is based on a sequence length N of the Golay sequence pairs.

17. The product of claim 13, wherein the at least one field comprises at least one of a Short Training Field (STF), a Channel Estimation Field (CEF), or a guard interval.

18. An apparatus comprising logic and circuitry configured to cause a wireless station to:
based on a stream number of a spatial stream of a Multiple-Input-Multiple-Output (MIMO) transmission over a plurality of spatial streams, select a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and
process at least one field of the spatial stream based on the complementary Golay sequence pair.

19. The apparatus of claim 18, wherein the one or more weight vectors comprise a plurality of weight vectors corresponding to a respective plurality of stream numbers, which are between 9 and 16.

20. The apparatus of claim 18, wherein the one or more weight vectors are based on a sequence length N of the Golay sequence pairs.

21. The apparatus of claim 18, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1, −1,+1,−1,−1] | [−1,−1,−1,−1, +1,−1,+1,+1,−1] |
| 10 | [+1,−1,+1,−1,−1,+1,−1] | [+1,−1,+1,−1, −1,+1,−1,−1] | [+1,−1,−1,−1, +1,−1,+1,+1,−1] |
| 11 | [−1,−1,+1,−1,+1,−1,+1] | [−1,−1,+1,−1, +1,−1,+1,−1] | [−1,−1,−1,−1, +1,+1,+1,−1,−1] |
| 12 | [+1,−1,+1,−1,+1,−1,+1] | [+1,−1,+1,−1, +1,−1,+1,−1] | [+1,−1,−1,−1, +1,+1,+1,−1,−1] |
| 13 | [−1,−1,+1,−1,+1,+1,+1] | [−1,−1,+1,−1, +1,+1,+1,−1] | [−1,−1,−1,+1, −1,−1,+1,+1,−1] |
| 14 | [+1,−1,+1,−1,+1,+1,+1] | [+1,−1,+1,−1, +1,+1,+1,−1] | [+1,−1,−1,+1, −1,−1,+1,+1,−1] |
| 15 | [−1,−1,+1,+1,−1,+1,−1] | [−1,−1,+1,+1, −1,+1,−1,−1] | [−1,−1,−1,+1, −1,−1,+1,−1,+1] |
| 16 | [+1,−1,+1,+1,−1,+1,−1] | [+1,−1,+1,+1, −1,+1,−1,−1] | [+1,−1,−1,+1, −1,−1,+1,−1,+1] |

22. The apparatus of claim 18, wherein the at least one field comprises at least one of a Short Training Field (STF), a Channel Estimation Field (CEF), or a guard interval.

23. The apparatus of claim 18 comprising one or more antennas, a memory, and a processor.

24. A product comprising one or more tangible computer-readable non-transitory storage media comprising computer-executable instructions operable to, when executed by at least one computer processor, enable the at least one computer processor to cause a wireless station to:
based on a stream number of a spatial stream of a Multiple-Input-Multiple-Output (MIMO) transmission over a plurality of spatial streams, select a complementary Golay sequence pair from a Golay Sequence Set (GSS), the stream number equal to or greater than 9, the GSS comprising a plurality of complementary Golay sequence pairs based on a plurality of weight vectors, the plurality of weight vectors comprising one or more weight vectors corresponding to one or more respective stream numbers, which are equal to or greater than 9; and
process at least one field of the spatial stream based on the complementary Golay sequence pair.

25. The product of claim 24, wherein the one or more weight vectors comprise one or more of the following weight vectors:

| Spatial stream number | $W_K$ vector for 128 sequence length | $W_K$ vector for 256 sequence length | $W_K$ vector for 512 sequence length |
|---|---|---|---|
| 9 | [−1,−1,+1,−1,−1,+1,−1] | [−1,−1,+1,−1, −1,+1,−1,−1] | [−1,−1,−1,−1,+1, −1,+1,+1,−1] |
| 10 | [+1,−1,+1,−1,−1,+1,−1] | [+1,−1,+1,−1, −1,+1,−1,−1] | [+1,−1,−1,−1,+1, −1,+1,+1,−1] |
| 11 | [−1,−1,+1,−1,+1,−1,+1] | [−1,−1,+1,−1, +1,−1,+1,−1] | [−1,−1,−1,−1,+1, +1,+1,−1,−1] |
| 12 | [+1,−1,+1,−1,+1,−1,+1] | [+1,−1,+1,−1, +1,−1,+1,−1] | [+1,−1,−1,−1,+1, +1,+1,−1,−1] |
| 13 | [−1,−1,+1,−1,+1,+1,+1] | [−1,−1,+1,−1, +1,+1,+1,−1] | [−1,−1,−1,+1,−1, −1,+1,+1,−1] |
| 14 | [+1,−1,+1,−1,+1,+1,+1] | [+1,−1,+1,−1, +1,+1,+1,−1] | [+1,−1,−1,+1,−1, −1,+1,+1,−1] |
| 15 | [−1,−1,+1,+1,−1,+1,−1] | [−1,−1,+1,+1, −1,+1,−1,−1] | [−1,−1,−1,+1,−1, −1,+1,−1,+1] |
| 16 | [+1,−1,+1,+1,−1,+1,−1] | [+1,−1,+1,+1, −1,+1,−1,−1] | [+1,−1,−1,+1,−1, −1,+1,−1,+1] |

\* \* \* \* \*